Figure 1:
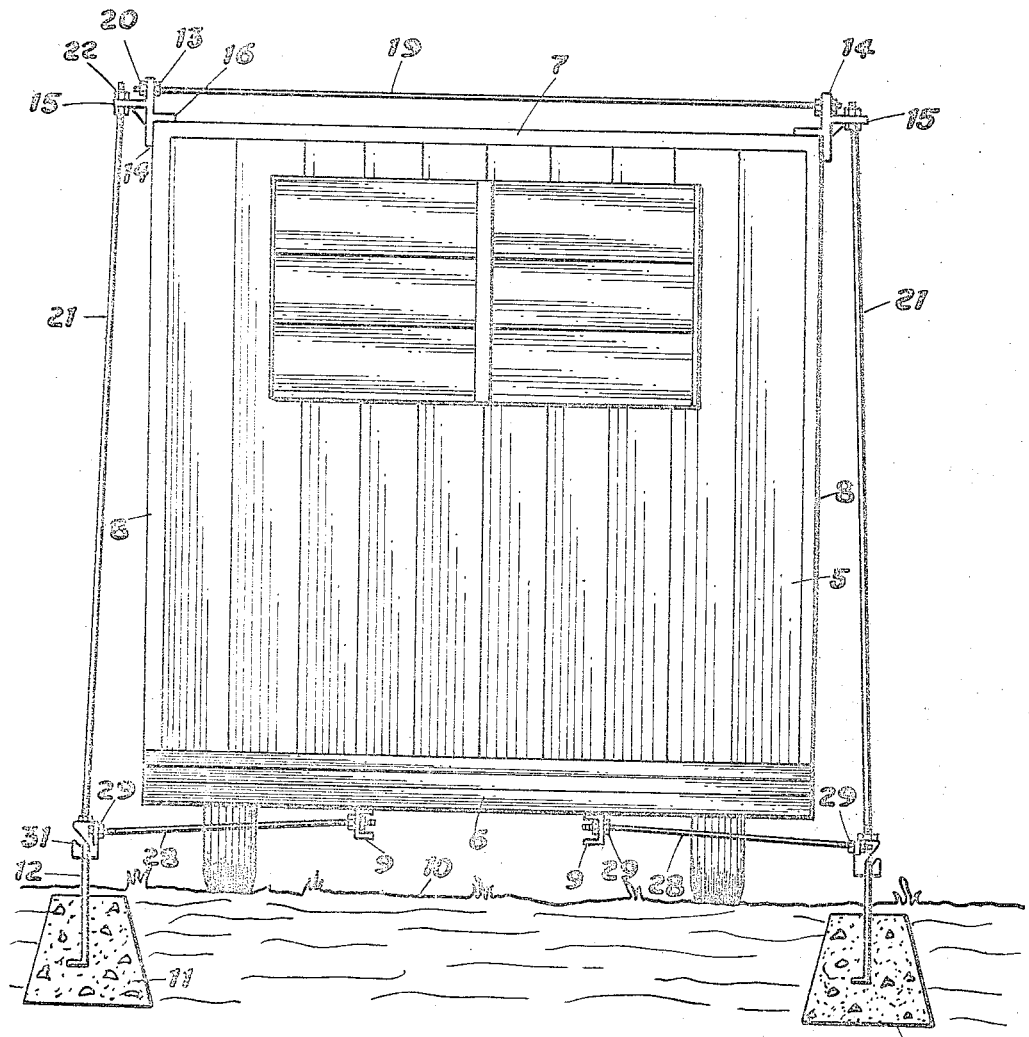

INVENTOR.
NARDIE F. GRIMELLI,
BY WILLIAM ALLEN WALKER

ATTORNEY

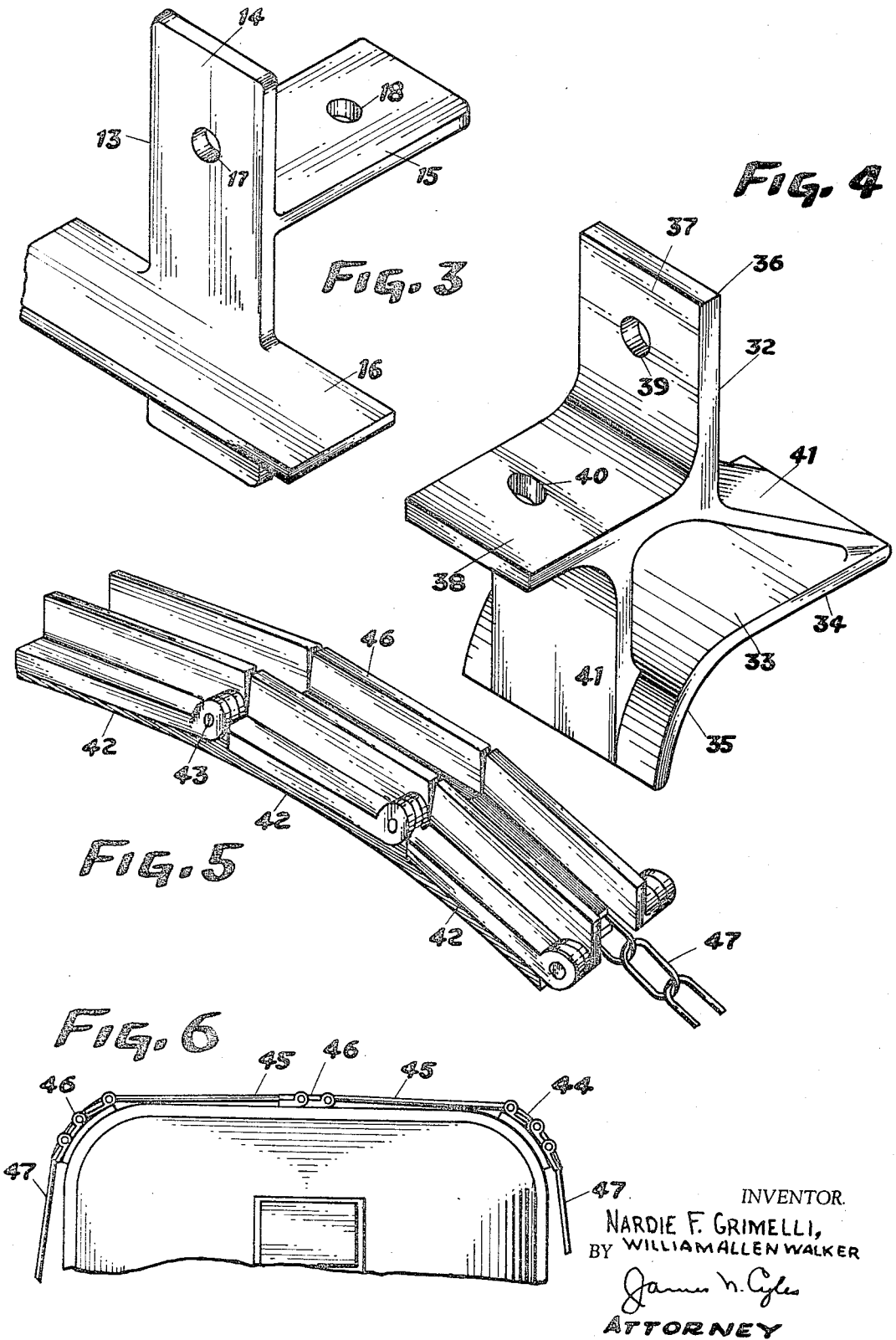

United States Patent Office 3,335,531
Patented Aug. 15, 1967

3,335,531
TIE-DOWN FOR HOUSE TRAILERS OR THE LIKE
Nardie F. Grimelli, 2060 Garfield St., Hollywood, Fla. 33020, and William A. Walker, 1222 W. Las Olas Blvd., Fort Lauderdale, Fla. 33312
Filed Jan. 26, 1966, Ser. No. 523,080
6 Claims. (Cl. 52—23)

This invention relates to a brace tie-down device for wheeled house trailers and has particular reference to a device that may be engaged over the trailer transversely and anchored into fixed concrete blocks embedded within the ground.

The invention contemplates corner brackets for connection to cross rods and also downwardly extending rods upon each side of the trailer that are connected to hooks carried by relatively heavy concrete blocks that are embedded in the ground adjacent each side of the trailer and with the hooks being also tied to channel frame members of the trailer and so that the trailer is held against lateral movement or tipping.

The invention further contemplates upper brackets for fitment upon the corners of the trailer roof and whereby to conform to the particular curvature of the roof and the curvature of the corners and with the brackets being so shaped that they will not mar the corners of the rood and with the downwardly extending brace rods having hooks adjustably engaged therewith for fitment with the hooks that extend from the ground anchors.

Novel features of construction and operation of the device will be more clearly apparent during the course of the following description, reference being had to the accompanying drawings wherein has been illustrated a preferred form of the invention and wherein like characters are employed to denote like parts throughout the several figures.

Figure 2:
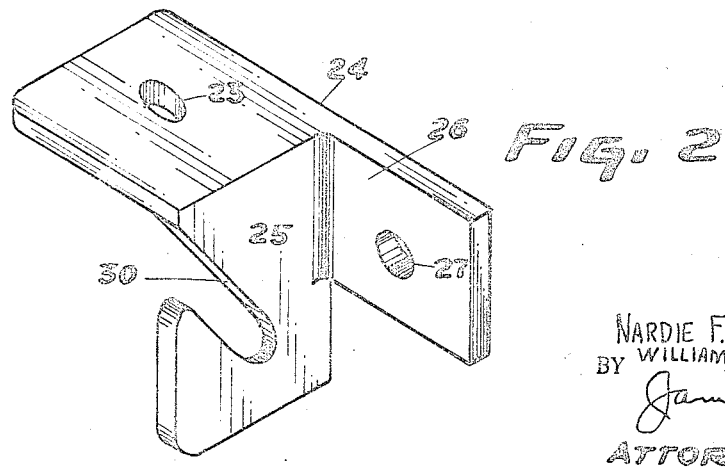

In the drawings:

FIGURE 1 is an end view of a conventional house trailer showing the invention applied thereto, FIGURE 2 is a perspective view of a bracket device for engagement with a ground anchor, FIGURE 3 is a perspective view of a bracket for fitment against the corners of the trailer for receiving brace rods, FIGURE 4 is a perspective view of a modified form of corner bracket, FIGURE 5 is a perspective view of a link type bracket for engagement with rounded corners of trailers, and FIGURE 6 is an end view of a house trailer showing the use of the former bracket illustrated in FIGURE 5 to the curved corners of the trailer.

Referring specifically to the drawings, there has been illustrated a house trailer 5, having a sill 6 and a roof 7. The trailer has flat side walls 8. Fitted beneath the sill 6 are conventional channel frame members 9, all forming a part of the house trailer and forming no part of the present invention. With the trailer disposed in parked position upon the ground 10, there has been provided outwardly from the trailer, a pair of concrete anchors 11. Each of the anchors 11 carry an upstanding hook 12 that projects slightly above the ground level 10 and with the anchors being of such weight and embedded to such depth that they will fully hold the trailer against movement under the influence of excessive wind pressures.

Fitted to the upper corners of the roof and side walls 8, are molded metallic brackets, illustrated as a whole by the numeral 13, see particularly FIGURE 3. The brackets 13 are provided with flat vertically arranged plates 14, a right angle plate 15 that projects outwardly from the plate 14 and the plate 14 is also provided with a second oppositely extending plate 16 that overlies the roof of the trailer. The plate 15 and the plate 14 are provided with cylindrical apertures 17 and 18. The brackets 13 upon opposite sides of the trailer are connected by a rod 19, threaded at its opposite ends to extend through the apertures 17 and clamping nuts 20 secure the rod to the brackets. Also extending downwardly from the bracket plates 15 for engagement through the apertures 13, are slightly diagonal brace rods 21, the opposite ends of which are threaded and fixed with respect to the plates 15 by lock nuts 22.

The lower ends of the rods 21 are adapted to be engaged within apertures 23 of lower hook plates 24. The brackets 24 have a right angle web extension 25 and an extending gear 26. The gear 26 is apertured at 27 to receive brace rods 28, that are anchored at their inner ends to the channels 9 and with the ends of the rods 28 being threaded to receive clamping nuts 29. The web 25 is inwardly diagonally slotted as shown at 30, for engagement with the hooked end 31 of the anchor rods 12.

The operation of this form of the invention will be clearly apparent, since it merely requires that the brackets 13 and the several rods 19 and 21 be connected to the plates 14 and 15 and then the lower ends of the rods 21 connected into the apertures 23, of the plates 24 where they are secured fixed in bracing position by nuts threaded upon their threaded ends. The plate 24 is then engaged with the hook 31 of the anchors 12 and with the nuts being securely tightened, the trailer is held against shifting. It should also be apparent that the several elements described may be placed at convenient points upon the trailer, both front and rear and will securely hold the trailer against wind pressures, such as that experienced in hurricanes.

In FIGURE 4 there has been illustrated a modified form of upper bracket, designated by the numeral 32, comprising a base plate 33, having a flat portion 34 that rests upon the roof of the trailer and a curved portion 35 that conforms to the slight curvature of a roof corner. The plate 33 carries a right angle anchor plate 36, having an upstanding portion 37 and a right angle horizontal portion 38. The portions 37 and 38 are apertured at 39 and 40 and the bracket plate 32 is molded integral with the plate 33 and held in elevated position by brace arms 41. In the use of this form of the invention, the brace rods 19 and 21 are anchored into the apertures 39 and 40 and subsequently connected to the anchor rods 12 and the lateral rods 28 by the bracket 24.

FIGURE 5 shows a further modified form of bracket device wherein a plurality of chain-like segments 42 are hingedly connected together at their ends as indicated at 43, whereby a plurality of the members 42 may conform to the relatively wide curvature of certain forms of house trailers. A pad 44 may be disposed beneath the segments 42 to prevent scratching or otherwise marring the finish of the trailer corners. The innermost segments 42 may be connected together by brace rods 45, pivotally connected to link members 46 of an intermediate connector and whereby the rods 45 control the position of the links 42 and to determine the amount of area that the links will engage when in the bracing position. One outermost link 42, shown in FIGURE 5 may be provided with a chain 47 upon opposite sides of the trailer and with the chain 47 extending downwardly for hooked engagement with the anchor hooks 31. It being understood that the chains are adjustable and that the bracing of the roof by the links is also adjustable and of course in either instance, the brace rods 28 are connected to the bracket 24 to securely hold the trailer against movement.

It will be apparent from the foregoing that a very novel form of brace means has ben provided for house trailers to prevent shifting or tipping of the trailer under excessive wind conditions. The several brace members are removable and also adapted to be unhooked from the hooks 12 to permit storage of the brace members and to permit the use of the trailer in traveling. It is contemplated that particular areas in trailer storage areas will be supplied with ground anchors 11 having the upstanding hooks 12 so that, a trailer parked between a pair of ground anchors 11 may be quickly and easily braced with the devices of the present invention and securely ties the trailer to the ground. The several brackets and the links are preferably formed of cast aluminum or of course any other metal and the rods 19 and 21 may be provided with protective sleeves to prevent rusting.

It is to be understood that the invention is not limited to the precise construction shown, but that changes are contemplated as readily fall within the spirit of the invention as shall be determined by the scope of the subjoined claims.

We claim.

1. Brace means for application to a wheeled house trailer whereby to anchor the trailer against shifting or tilting, comprising brackets that have fitment with respect to corners of the roof and side walls of the trailer, means connecting the brackets across a roof of the trailer, brace means connected with each bracket and that extends downwardly and is connected to a hook-type connector that has hooking engagement with an upstanding hook that is fixed into a concrete block within the ground and a brace rod connected to each of the connectors and that is secured to a channel frame member beneath the bottom of the trailer.

2. Brace means for a wheeled house trailer having corner brackets that overlie and have fitment with respect to the opposite corners of the trailer formed by the roof and side walls, the brackets being connected to maintain the brackets against displacement from the corners of the trailer, each bracket being also connected to a downwardly extending rod that has fixed engagement with a hook-type connector at its lower end and with the hook type connector engaged with an upstanding hooked rod that is fixed into a concrete block within the ground, each hook-type connector being also fixed against lateral displacement by a rod that is connected to the last named connector and also to a channel type frame member of the trailer.

3. The structure according to claim 2 wherein the first named brackets are provided with an upstanding plate having a right angular plate that has fitting engagement upon the roof of the trailer and with the plate extending downwardly to also engage the side wall of the trailer, the bracket also having an outwardly extending plate that projects outwardly beyond the trailer, the first named plate being apertured whereby the brackets are connected by rigid rod that has fitment into the aperture of the first named plate and with its ends threaded to receive adjusting and clamping nuts, the last named plate adapted to receive a threaded end of a downwardly and outwardly extending rigid rod and with the upper end of the rod being threaded to engage the aperture of the last named plate and for receiving adjusting and clamping nuts, the hook-type connector having a horizontal plate and a vertical plate that is inwardly and downwardly slotted and with the plate being apertured to receive a threaded end of the downwardly extending rod, the downwardly extending rod at its lower end being thread to receive clamping nuts, a reduced extension formed upon the hook-type connector that is vertically arranged and apertured to receive a brace rod that is threaded at its opposite ends to engage the reduced extension and to also engage an aperture formed in a channel frame member of the trailer beneath its bottom, the connector adapted to receive a hooked end of a fixed brace rod that is anchored into a concrete block within the ground.

4. The structure according to claim 2 wherein the upper brackets have a base plate that lies upon the top of the trailer and that is curved at its outer end to conform to the curvature of the corner of the trailer, the last named bracket having a horizontal plate extension and an upper extension that is apertured to receive a brace rod that extends over the roof of the trailer for holding the brackets in relatively fixed engagement with the corner of the trailer, the horizontal extension being connected to the downwardly extending brace rods, the several upper brackets and the connector being integrally molded of aluminum.

5. A brace device for preventing shifting or tilting of a wheeled trailer under wind conditions wherein the upper corners of the trailer are rounded, that comprises bracket devices that overlie each rounded corner and with the bracket devices being formed of multiple links whereby the brackets may conform to the curvature of the corners of the trailer roof, means for connecting each of the brackets together across the top of the roof to prevent displacement of the brackets that comprises a pair of rods that are connected to the innermost links and with the rods also being provided at their inner ends with linked connectors, the brackets at their outer ends being connected to hooked devices at their lower ends that engage upstanding hooked rods that are fixed into concrete blocks disposed within the ground and outwardly beyond the sides of the trailer, the last named brackets being connected by rods to channel frame members beneath the bottom of the trailer.

6. The structure according to claim 5 wherein the linked brackets are connected to the hooked brackets by flexible connectors, such as chains.

References Cited

UNITED STATES PATENTS

| | | | |
|---|---|---|---|
| 269,018 | 12/1882 | Crowell et al. | 52—23 |
| 777,441 | 12/1904 | Small | 52—23 |
| 1,705,381 | 3/1929 | Snyder | 248—361 |
| 1,864,403 | 6/1932 | Bradley | 52—23 X |
| 2,353,017 | 7/1944 | Denton | 248—361 |
| 3,054,151 | 9/1962 | Shankland | 248—361 X |

CHANCELLOR E. HARRIS, *Primary Examiner.*

F. DOMOTOR, *Assistant Examiner.*